Nov. 12, 1929.  N. LESTER  1,735,049
CASTING APPARATUS FOR LAMINATED ROTORS
Filed Sept. 17, 1928   3 Sheets-Sheet 1

Inventor
Nathan Lester
By Attorneys

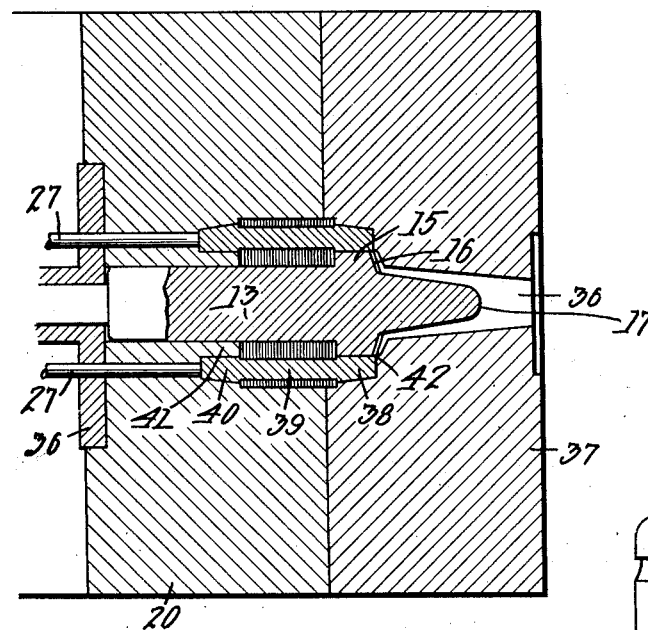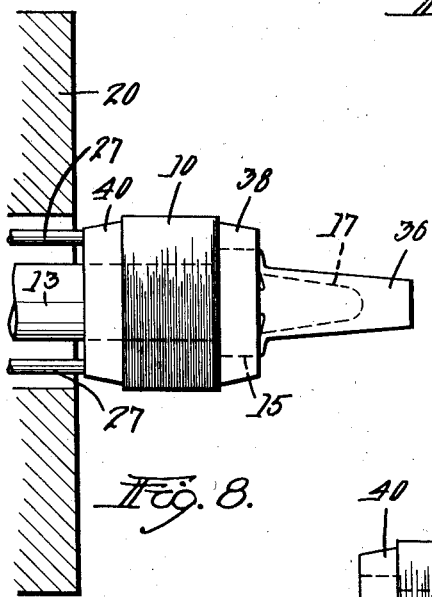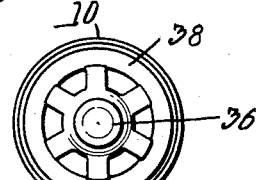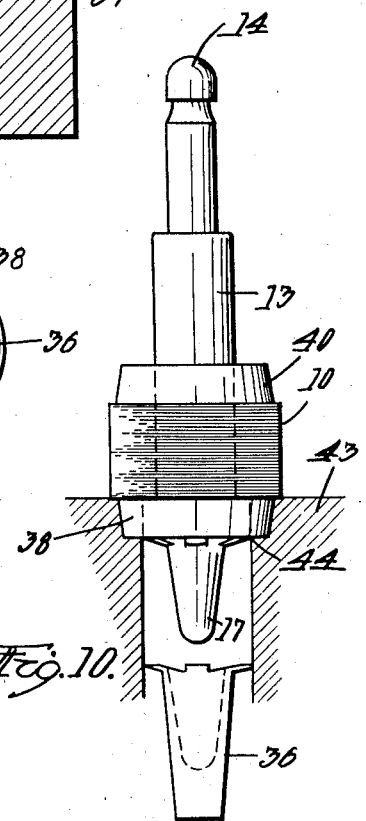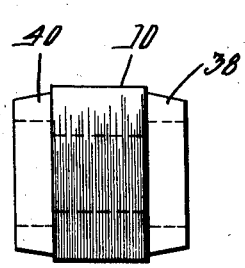

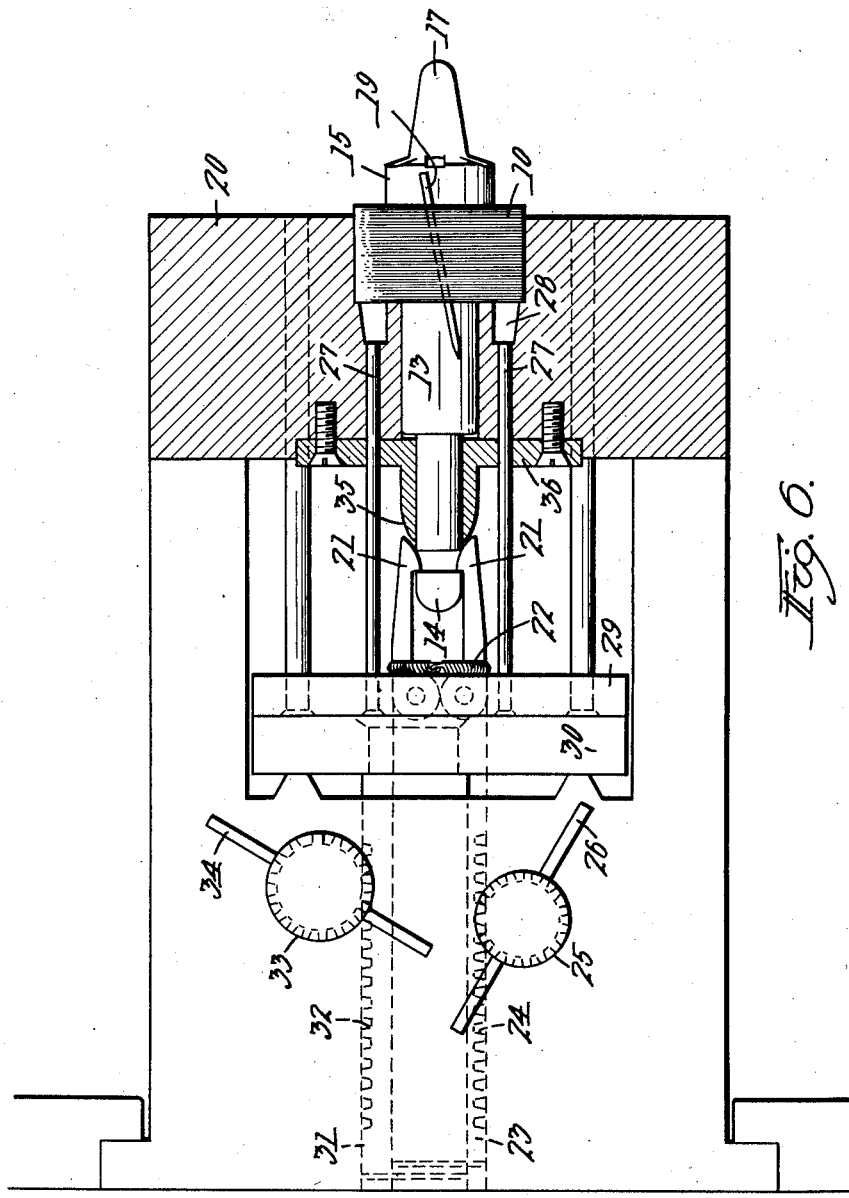

Patented Nov. 12, 1929

1,735,049

UNITED STATES PATENT OFFICE

NATHAN LESTER, OF WORCESTER, MASSACHUSETTS, ASSIGNOR TO P. & R. TOOL COMPANY, INC., OF WORCESTER, MASSACHUSETTS, A CORPORATION OF MASSACHUSETTS

CASTING APPARATUS FOR LAMINATED ROTORS

Application filed September 17, 1928. Serial No. 306,412.

This invention relates to the casting of the soft metal part of a rotor made up of laminated iron sheets for use in an induction motor.

In the making of laminated rotors for the purpose above described, there has been considerable difficulty heretofore because they have been made solid and the passage through the center had to be bored out and counterbored at each end and one object of this invention is to avoid this mechanical operation and likewise avoid the centering of the casting in a machine for boring it.

Other objects of this invention are to provide a method of procedure by which the laminations can be assembled on a core in a very simple way with the openings in alignment and then the openings skewed a little as desired without displacing them otherwise; to provide a single arbor on which the plates are thus assembled which goes into the casting dies and is removed therefrom with the casting and itself acts as a punch to remove the sprue and finish that surface on the casting; to provide simple means by which it is then disconnected from the casting and the sprue also removed; to provide simple and convenient means for holding the core with the laminations thereon in place in the dies and means for ejecting them when the casting is made.

Other objects and advantages of the invention will appear hereinafter.

Reference is to be had to the accompanying drawings in which—

Fig. 6 is a central sectional view of one of the die members constituting the mold and showing the arbor and laminations in position and the mechanism for holding the arbor and ejecting the product;

Fig. 7 is a similar view of the mold with all the die sections in place;

Fig. 8 is a view of one of these dies with the cast rotor ejected therefrom, the other die being removed;

Fig. 9 is an end view of the casting produced;

Fig. 10 is a view showing the casting and arbor and means by which they are separated and the sprue is cut off, and Fig. 11 is an elevation of the completed rotor.

Figure 1:
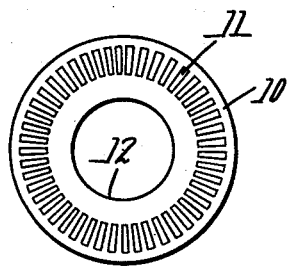
Figs. 1 and 2 are a plan and edge view of one of the iron perforated laminations which constitute a part of the rotor when completed.
Figure 2:

Referring to the drawings, the rotor shown in Fig. 11 is made up of a series of laminations 10, each having a series of rotor slots 11 therethrough arranged in a circle and each having a central perforation 12 (Figs. 1 and 2). These laminations, of course, are formed of sheet metal and all made exactly alike.

After these laminations are formed, the first step in assembling them is to provide an arbor 13 of metal having a head 14 thereon and a hub 15. This hub is cylindrical having a square corner constituting a cutting edge and is provided with grooves 16 arranged on a slant but radially for purposes to be described. It is provided with a projecting conical end 17 rounded off. This is set up in a support 18 shown in Fig. 3, which is shaped to receive the bottom of the hub 15 with the grooves 16 and fit the same well enough so that it will stand vertically. This support 18 is provided with a recess in which is a removable pin 19 projecting vertically therefrom.

The parts being set up like this, the laminations 10 are put on the arbor 13 to the desired height, each one being turned a little to bring the pin 19 through one of the slots 11. This results in the piling of these series of laminations on the arbor with the slots in alignment so that when put in the dies the metal will flow through and form a series of connections between the top and bottom. The arbor 13 along the part which carries the laminations is of the same size as the central perforations 12 so that the laminations are positively centered by it.

Figure 3:
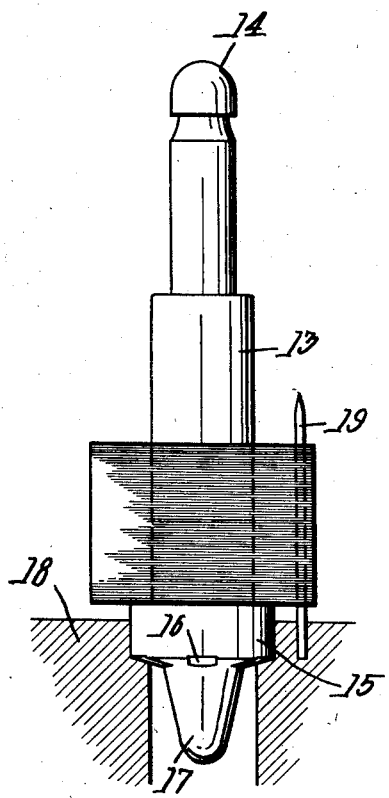
Fig. 3 is a side view showing a series of these laminations assembled on a core in accordance with this method.
Figure 4:
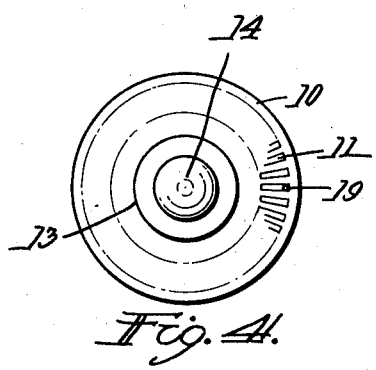
Fig. 4 is a plan of the construction shown in Fig. 3.
Figure 5:
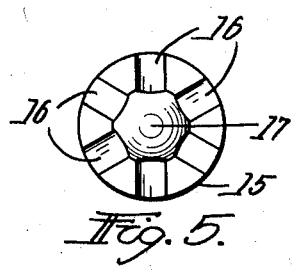
Fig. 5 is a bottom plan of the same device.

When a sufficient number of laminations have been assembled on the arbor it is removed from the position shown in Fig. 3, taking the pin 19 with it and this pin is given a light blow on one end to swing it over into slightly inclined position for the purpose of making the passages extending through the series of slots slightly wider and giving more strength to them as produced. This is indicated in Fig. 6 where the arbor is shown inverted and put down into a die member 20.

The shouldered head 14 of the arbor is gripped by two or more hooks 21 which are forced inwardly by a spring or springs 22 surrounding them in the manner indicated in this figure. These hooks are pivoted below on a slide 23 having a rack 24 operated by a pinion 25 having a handle 26. Pulling down on this rack will bring the arbor 13 and attached parts down into the die.

It will be seen also that a series of ejector rods 27 extend to the edge of the die cavity 28 in the die member 20 and that they are mounted on a movable plate 29 resting on a fixed plate 30. The plate 29 is carried by a slide 31 having a rack 32 operated by a pinion 33 having handles 34 as in the other case. When this slide 31 is raised it raises the ejectors 27 and forces the casting out of the mold at the same time the hooks 21, are moved upwardly by the shouldered head 14 and engage a circular cam 35 fixed on a plate 36 so as to separate the hooks. This turns the other pinion.

In Fig. 7 is seen the position of the parts when the metal is introduced through the space 36. If this were an ordinary gravity casting mold this could be turned up to constitute a top constituting a sprue but as this is intended for die casting, it is shown in horizontal position and the metal is forced in at that end, as is common in die casting machines.

The purpose of the grooves 16 will now be seen as it insures passages for the metal around the circular corner 42 of the die member 37 itself and the circular corner of the hub 15, both of which are sharp. They come into contact. The thin sections of metal left in the grooves are separated by open spaces.

The metal flows around the exterior of the hub 15 of the arbor and forms a ring 38 of cast metal. It flows through the slots 11, which are not perpendicular to the surfaces shown, so as to form strips 39 of metal all around passing through the laminations 10. At the other side it forms a ring 40 which, of course, is integral with the ring 38. The arbor 14 itself is provided with the cylindrical projecting hub 15 to form the counter bore at one end.

On the other end the body of the die member 20 has a cylindrical projection 41 which surrounds the core 13 and forms the counter bore at the opposite end in the ring 40. The arbor 13 of course forms a passage which is usually bored, as stated above.

The product is provided with a so-called sprue or riser 36 as cast which projects out at one end, the other end being entirely finished. This projection 36 constitutes a waste member which is hollow, having comparatively thin walls on account of the end 17 of the arbor. It is connected with the end ring 38 only by the metal in the grooves 16, which are separated by wide spaces. The small and thin areas between these spaces are the only parts that have to be cut off afterwards. When taken from the mold the casing in the form shown in Fig. 8, with the sprue 36 intact, is placed in a support 43 and a light blow given on the head 14 of the arbor drives it out. This support has a recess for the cast end 38 with an edge 44 at the corner. The action of driving the arbor out of the rotor cuts the sprue off at the edge 44 and it drops as shown in Fig. 10. This leaves the article as shown in Fig. 11, which has already been sufficiently described.

By this procedure a complete casting is produced which has no finishing to be done. The opening through the center is true and these counter bores at the end are also true and exactly centered. No time is spent in producing them except what is spent in producing the casting itself. The assembling of the parts is simple and convenient and the separation of the arbor from the mold is provided for in a very convenient way, which also cuts off the sprue and finishes the edge.

Although I have illustrated and described only one series of steps and only one form of mechanism I am aware of the fact that modifications can be made in both by any person skilled in the art without departing from the scope of the invention as expressed in the claims.

Therefore I do not wish to be limited in this respect but what I do claim is:—

1. In a device for casting a laminated rotor, the combination with a pair of die members constituting a mold, one of them having a cylindrical cavity for receiving and fitting the metal laminations of the rotor, an annular groove communicating therewith for receiving the metal to form the end of the rotor and a passage through the center, of an arbor fitting in said passage and fitting the interior of said laminations, such passage being spaced from the groove, the arbor being provided with a hub on the opposite end projecting over the edge of the end plate and having grooves in its opposite shoulder for allowing the metal to pass through, the other die member having an annular groove extending to said shoulder for receiving the metal to form the opposite end of the rotor and provided with a sprue space, the shoulder and this die member touching each other along a circle with said grooves passing under the circle, and the arbor having a conical projection into the sprue space, whereby the sprue can be cut off easily around said circle after the casting is made.

2. In a device for casting a laminated rotor, the combination with a pair of die members constituting a mold, one of them having a cylindrical cavity for receiving and fitting the laminations of the rotor, of an arbor provided with a hub on the end having grooves in its opposite shoulder for allowing the metal to pass through, having a sprue space, the shoulder and this die member touching each other along a circle with said grooves passing under the circle, and the arbor having a conical projection into the sprue space, whereby the sprue can be cut off easily around said circle after the casting is made.

3. In a device for casting a laminated rotor, the combination with an arbor having a hub near one end and the body of the arbor being of the same shape as the openings in the centers of the slotted laminations to be received, whereby the laminations can be placed on the core and sufficient laminations assembled on it for the rotor, said laminations coming against the hub and the slots being skewed, and a support for holding the core in position, of a mold comprising two die members for receiving the arbor and laminations and having cavities in each die member at opposite ends of the series of plates for casting the ends of the rotor, said ends communicating with each other through rotor slots in the laminations and means whereby metal can be introduced around the hub of said core.

4. In a device for casting a rotor made up of slotted laminations, the combination with a metallic arbor having a hub near one end and the body of the arbor being of the same shape as the openings in the centers of said laminations whereby the arbor can be placed vertically with the hub at the bottom and sufficient laminations assembled on it for the rotor, said laminations coming against the upper end of the hub and resting thereon, a support for holding the arbor in position and also provided with a vertical recess, and a removable pin located in said recess for receiving one of the slots around the edge of each of the plates and aligning said slots therein in skewed position, of a mold for receiving the core and plates and having cavities for casting the ends of the rotor, said ends communicating with each other through said slots.

5. In a device for making a compound casting, the combination with a pair of dies, of a metal arbor having a shank adapted to extend through the metal to which the casting is to be cast, and a hub having a conical end surface provided with radial grooves and a circular edge so as to constitute a punch, and a support for the casting cast on the arbor, said support having a recess having an edge co-operating with the edge on the core to cut the sprue from the casting.

6. In a device for casting a laminated rotor, the combination with a pair of die plates having cavities for receiving the metal to be cast and a series of the laminations and comprising an arbor passing through the laminations and centering them, said arbor having a shoulder and head at the end, a slide connected with the mold and movable toward and from it, a pair of hooks carried by said slide for engaging under the shouldered head so that, when the hooks are moved away from the mold, they will draw the arbor into proper position therein, said mold having a cam thereon for engaging the hooks when moving in the opposite direction and disengaging them from said head.

7. In a device for casting a laminated rotor, the combination with a pair of die plates having cavities for receiving the metal to be cast and a series of laminations and comprising an arbor passing through the plates and holding them in position, said arbor having a shoulder and head at the end, a slide connected with the mold and movable toward and from it, a pair of hooks carried by said slide for engaging under the shouldered head so that, when the hooks are moved away from the mold, they will draw the arbor into proper position therein, a rack and pinion for raising and lowering said slide, a slidable plate having ejecting rods extending to the surface of the mold cavity and a rack and pinion for moving said plate to eject the rotor.

In testimony whereof I have hereunto affixed my signature.

NATHAN LESTER.